June 1, 1965  C. WHEATLEY  3,186,724

FLOATING STUFFING GLAND

Filed July 5, 1962

INVENTOR.
Charles Wheatley
BY William S. Dorman
ATTORNEY

United States Patent Office 3,186,724
Patented June 1, 1965

3,186,724
FLOATING STUFFING GLAND
Charles Wheatley, Tulsa, Okla., assignor to Charles Wheatley Company, Tulsa, Okla., a corporation of Oklahoma
Filed July 5, 1962, Ser. No. 207,731
2 Claims. (Cl. 277—59)

This invention relates to improvements in stuffing glands and more particularly, but not by way of limitation, to an improved seal for precluding fluid leakage between relatively movable contacting surfaces and simultaneously preventing fluid leakage between relatively stationary contacting surfaces.

It is often desirable to provide a dynamic sealing for precluding leakage around a rotatable shaft, such as the pivot shaft of a valve structure, or the like, and in addition, to provide a static seal between relatively stationary parts of the structure. This is usually accomplished by providing separate sealing means whereby one sealing device provides the dynamic sealing and another sealing device is utilized for providing the static sealing. This results in an increased overall manufacturing and installation cost. In addition, the efficient sealing of the opposed ends of the shaft is difficult in many instances, particularly if the shaft is of an excessive length. The longitudinal axis of a relatively long shaft is usually not true, or not exactly straight, thus creating an alignment problem between the shaft and the sealing means and reducing the efficiency of the sealing device.

The present invention contemplates a novel stuffing gland assembly to provide a combined dynamic and static sealing action in a unitary or self-contained structure, and particularly designed and constructed to provide a floating action with respect to the rotatable or movable member. In this manner, the stuffing gland may automatically adjust to any misalignment between the movable member and the stationary member to compensate for any longitudinal deviation of the movable member, such as a rotatable shaft, and provide an efficient sealing therebetween.

The novel stuffing gland comprises an annular body member provided with a plurality of sealing rings adapted for disposition adjacent the outer periphery of a rotatable shaft, or the like, to efficiently preclude leakage of fluid therearound. In addition, the stuffing gland is provided with lubricating means in association with the dynamic sealing members for increasing the overall operating efficiency of the device and prolonging the useful life of the sealing rings. A safety seal means is also provided to cooperate with the dynamic sealing members to preclude leakage around the movable shaft in the event of failure of any of the associated dynamic sealing rings. The stuffing gland is further provided with sealing means for precluding leakage of fluid between the gland body and the stationary structure supporting the movable member, thus providing a unitary structure having a dual function.

The stuffing gland is secured in position around the movable or rotatable shaft by a retaining member wherein sufficient clearance is provided for the stuffing gland to permit a floating action or adjustment thereof in accordance with the actual configuration of the shaft, regardless of whether or not the longitudinal axis of the shaft is exactly straight. Thus, the novel stuffing gland provides an efficient combined dynamic and static sealing in a single self-contained structure, regardless of any deviations of the rotatable shaft, or other movable member, from a true or straight axis of rotation.

It is an important object of this invention to provide a novel stuffing gland having combined dynamic and static sealing means for efficiently and simultaneously precluding leakage of fluid between relatively movable parts and relatively stationary parts.

It is another object of this invention to provide a novel stuffing gland assembly particularly designed and constructed for providing a floating action for the sealing portion to compensate for irregularities between relatively movable members and provide an efficient seal therebetween.

Another object of this invention is to provide a novel stuffing gland wherein the dynamic sealing members thereof are disposed therein in a manner for facilitating installation of the gland.

Still another object of this invention is to provide a novel stuffing gland wherein an efficient lubrication of the dynamic sealing means is provided for prolonging the efficient and useful life thereof.

A further object of this invention is to provide a novel floating stuffing gland having a safety seal means for cooperating with the dynamic seal means to assure an efficient sealing between relatively movable parts in the event of accidental failure of any of the associated sealing members.

A still further object of this invention is to provide a stuffing gland assembly having means for tightening the static seal means against the stationary structure for efficiently precluding leakage of fluid therebetween.

It is still another object of this invention to provide a novel stuffing gland which is simple and efficient in operation and economical and durable in construction.

Other and further objects and advantageous features of the present invention will hereinafter more fully appear in connection with a detailed description of the drawings in which.

Figure 1:
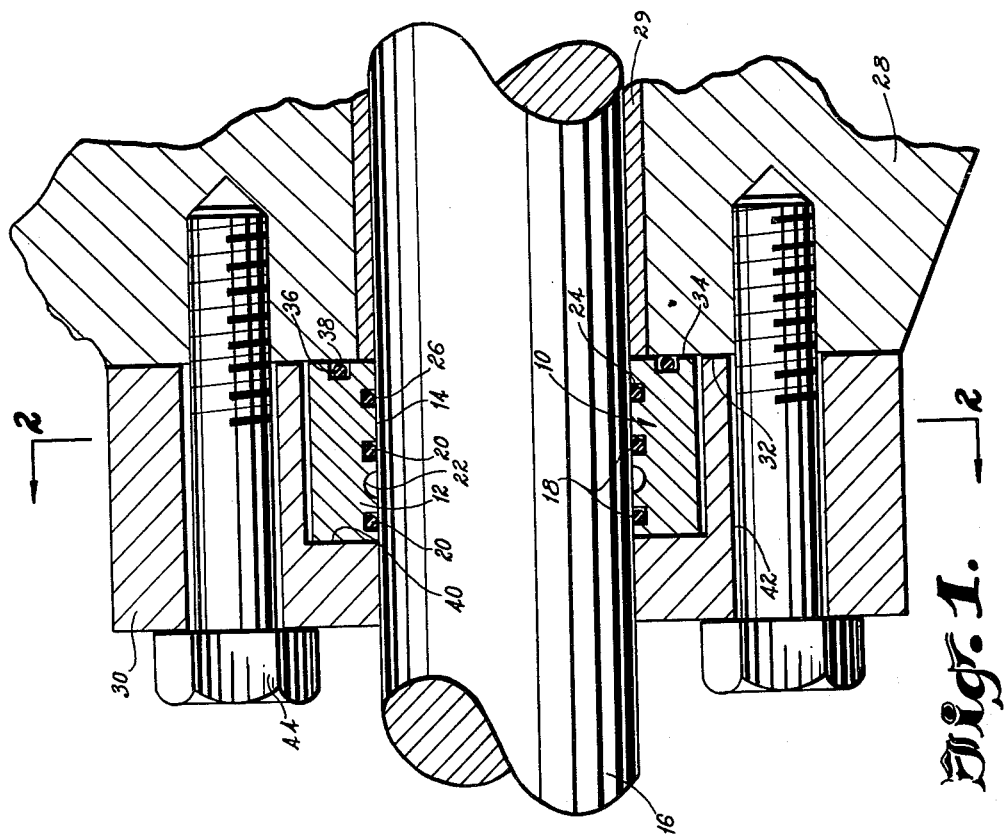
FIGURE 1 is a sectional elevational view of a stuffing gland assembly embodying the invention and depicted secured to a portion of a structure with which it may be utilized.
Figure 2:
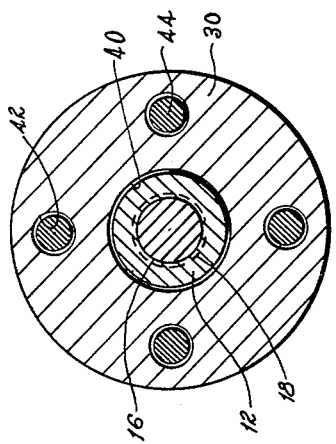
FIGURE 2 is a sectional view taken on line 2—2 of FIGURE 1 at a reduced scale.

Referring to the drawings in detail, reference character 10 generally indicates a stuffing gland comprising a plate or annular body portion 12 having a central bore 14 extending therethrough for receiving a rotatable shaft 16, or the like. At least two spaced annular grooves 18 are provided in the periphery of the bore 14, each for receiving a packing or sealing ring 20 therein. The sealing rings 20 may be of any suitable type, but are preferably of the O-ring type or resilient annular rings of substantially circular cross section, and bear against the outer periphery of the shaft 16 to provide a dynamic seal between the stuffing gland body 12 and the rotatable shaft 16. It will be apparent that whereas two of the grooves 18 are depicted in the drawings, substantially any desired number of the recesses 18 may be provided for retaining additional sealing members 20.

An annular recess or groove 22 is provided on the periphery of the bore 14 and interposed between the recesses 18 for receiving a suitable lubricant therein. It will be apparent that any well known passageway arrangement (not shown) may be provided in the body 12 for communication with the recess 22 for facilitating the injection of the lubricant thereto. However, in the present instance, it is preferable that the lubricant be injected or supplied to the groove 22 prior to installation of the stuffing gland 10 on the shaft 16. The lubricating agent provided in the recess 22 assures a lubrication between the packing rings 20 and the shaft 16 for reducing the inherent friction therebetween. In addition, the rotatable shaft 16 is thus substantially precluded from freezing or sticking in the bore 14 due to long periods of inactivity.

An additional annular groove 24 may be provided in the bore 14 and spaced from the grooves 18 as clearly shown in FIGURE 1 for receiving a safety seal member 26 therein. The seal member 26 may be of any suitable type and is preferably constructed from a plastic material, such as known under the trade name Teflon, and provides a safety feature for substantially precluding leakage of fluid around the shaft 16 in the event of failure of either or both of the sealing rings 20. It is to be understood that the sealing member 26 is not intended to provide the complete sealing possible with the sealing rings 20, but functions to enhance the sealing between the body 12 and shaft 16 upon accidental failure of the main sealing rings.

The stuffing gland body 12 is secured around the shaft 16 and adjacent a suitable support member 28, such as a valve body, or the like, but not limited thereto, by means of a retainer member 30. The structure 28 normally supports the shaft 16, and may be provided with a bearing sleeve 29 for facilitating rotation of the shaft, as is well known. The body 12 is disposed adjacent the flat surface 32 of the structure 28 in such a manner that the flat surface 34 of the body 12 bears thereagainst to provide a metal to metal seal. The surface 34 is provided with an annular groove 36 for receiving a packing member or sealing ring 38 which may be of of the resilient O-ring type for providing a static seal between the contacting surfaces 32 and 34. Although the packing ring 38 substantially fills the annular groove 36 when the body 12 is secured to the support 28, there is still sufficient clearance provided in the recess in order that the packing ring 38 may be compressed therein to further fill the recess 36 as differeing degrees of tightness of fit between the surfaces 32 and 34 may be desired according to the fluid pressure within the structure with which the stuffing gland 10 is to be utilized.

The retainer member 30 is preferably substantially cup-shaped and is provided with a central recessed portion 40 for receiving the body 12 therein. The recess 40 is of a depth substantially equal to that of the body 12, and is of a diameter slightly greater than the diameter of the body, as clearly shown in the drawings. Thus, while the body 12 is engaged in the longitudinal direction by the recess 40, the outer periphery of the body may not be in contact with the periphery of the recess 40. In this manner, a floating action is provided for the body 12 within the recess 40 whereby the body 12 may automatically shift or adjust therein in accordance with the disposition or alignment of the shaft 16. The retainer 30 may be secured to the structure 28 in any well known manner, and as disclosed herein, is provided with a plurality of spaced bores 42 extending therethrough for receiving bolts 44 which threadedly engage the support structure 28 whereby the pressure of the retainer member 30 thereagainst may be adjusted as desired to provide the required sealing engagement between the flat surfaces 32 and 34.

By way of illustration, the shaft 16 may be considered to be the pivot shaft of a valve structure, represented by the structure 28, and the shaft 16 may be of an extreme length. A stuffing gland 10 may be disposed around the outer extremities or the opposed ends of the shaft 16 to provide a combined dynamic and static sealing therearound for precluding leakage of fluid from the interior of the valve structure. The retainer member 30 may then be disposed around the shaft 16 and over the body 12 and secured to the valve structure 28 by the bolts 44. The bolts 44 may be tightened as desired to provide a combined metal to metal seal and sealing engagement of the packing member 38 whereby an efficient sealing is provided between the flat surfaces 32 and 34. As hereinbefore set forth, there is sufficient radial clearance between the recess 40 and the body 12 to permit the body 12 to seek the optimum position therein with respect to the shaft 16. In this manner, interference to the rotation of the shaft is reduced to a minimum for substantially eliminating binding of the shaft during use of the valve.

A dynamic seal is provided between the shaft 16 and the body 12 by the sealing members 20, and the lubrication therebetween greatly facilitates the efficiency of the sealing action as well as prolongs the useful life of the sealing members by reducing the friction acting thereon during rotation of the shaft. In the event one or more of the sealing rings 20 fails for any reason, the safety ring 26 effectively reduces any leakage of fluid between the shaft 16 and body 12 until such a time as the defective seal or seals may be replaced. It is to be noted that the novel stuffing gland and retaining member may be quickly and easily installed around the shaft 16 and secured to the structure 28 thus greatly facilitating the initial use thereof and replacement of any worn members.

From the foregoing, it will be apparent that the present invention contemplates a novel stuffing gland wherein a combined dynamic and static seal is provided between relatively movable and stationary members. A plurality of packing rings are provided within the body of the stuffing gland for a dynamic seal with respect to a rotatable shaft, and are efficiently lubricated to prolong the useful life thereof. Furthermore, the static seal provided between the stuffing gland body and the supporting structure may be adjusted according to the pressure exerted by the fluid contained within the structure for assuring an adequate sealing between the relatively stationary members. In addition, the stuffing gland is secured to the support structure in a manner whereby a floating action is permitted in order that the stuffing gland may automatically seek the optimum dipsosition with respect to the shaft extending therethrough. The novel stuffing gland is simple and efficient in operation and economical and durable in construction.

Whereas, the present invention has been described in particular relation to the drawings attached hereto, it should be understood that other and further modifications, apart from those shown or suggested herein, may be made within the spirit and scope of this invention.

What is claimed is:

1. A stuffing gland assembly comprising a body member having a central bore extending therethrough for receiving a rotatable shaft member, said body member provided with at least one substantially flat surface for disposition adjacent a stationary support member, a plurality of spaced annular grooves provided in the bore adjacent the rotatable shaft, a sealing ring disposed in each of said grooves to provide a dynamic sealing between the body and the rotatable shaft, second annular groove means provided in the bore and interposed between the first mentioned annular grooves for receiving a lubricant to provide lubrication between the sealing rings and the rotatable shaft, third annular groove means provided in the bore and spaced from the first mentioned annular grooves, safety seal means disposed in the third annular groove means to provide auxiliary sealing between the body and the rotatable shaft in the event of failure of the dynamic sealing means, at least one annular groove provided on the substantially flat surface of the body, a seal member disposed in the last mentioned annular groove to provide a static sealing between the body and the stationary support member, and retainer means secured to the stationary support and encasing the body member in a manner to permit a self-alignment of the body in accordance with the disposition of the rotatable shaft member, said retainer means having a bore for receiving the shaft therethrough, a chamber provided in the retainer means and surrounding the shaft for receiving said body member therein, said chamber being of a diameter slightly greater than the diameter of said body member and having an annular shoulder surrounding the bore and engaging the surface of said body member opposite the said flat surface thereof, and a plurality of threaded members extending through the retainer means for securing thereof to the stationary support whereby pressure of the stuffing gland against the stationary support may be varied.

2. A stuffing gland assembly comprising a body portion having a central bore adapted for disposition around a rotatable shaft, retaining means encasing the body portion and secured to a stationary support structure, dynamic sealing means provided in the bore for sealing between the body portion and the shaft, lubricating means associated with the dynamic sealing means for lubrication thereof, safety seal means provided in the bore and spaced from the dynamic sealing means for auxiliary sealing in the event of failure of the dynamic sealing means, static sealing means carried by the body and interposed between the body portion and the stationary support structure for precluding leakage of fluid therebetween, said retaining member being secured to the stationary support structure by a plurality of threaded members and engageable with the body portion for exerting pressure against the stationary support structure to provide a metal to metal seal therebetween for enhancing the sealing action of the static sealing means, and said retaining member provided with a recess portion of a diameter slightly greater than said body portion encasing the body whereby the body may automatically adjust therein in accordance with the disposition of the shaft, and said recess portion having an annular shoulder at one end thereof for bearing against the body whereby the sealing pressure of the static sealing means may be increased by tightening of the threaded members.

References Cited by the Examiner

UNITED STATES PATENTS

| 2,394,364 | 2/46 | Christensen | 277—59 |
| 2,757,053 | 7/56 | Green | 277—188 X |
| 3,013,826 | 12/61 | Sharp | 277—105 |
| 3,070,070 | 12/62 | Trevor | 277—77 X |

FOREIGN PATENTS 351,226  6/31  Great Britain.

LEWIS J. LENNY, *Primary Examiner.*

SAMUEL ROTHBERG, EDWARD V. BENHAM,
*Examiners.*